United States Patent [19]
de Groot

[11] Patent Number: 5,526,116
[45] Date of Patent: Jun. 11, 1996

[54] METHOD AND APPARATUS FOR PROFILING SURFACES USING DIFFRACTIVE OPTICS WHICH IMPINGES THE BEAMS AT TWO DIFFERENT INCIDENT ANGLES

[75] Inventor: Peter de Groot, Middletown, Conn.

[73] Assignee: Zygo Corporation, Middlefield, Conn.

[21] Appl. No.: 334,939

[22] Filed: Nov. 7, 1994

[51] Int. Cl.[6] ............................................. G01B 9/02
[52] U.S. Cl. ................................. 356/354; 356/359
[58] Field of Search ............................. 356/354, 355, 356/359, 360, 356, 374

[56] References Cited

U.S. PATENT DOCUMENTS

| | | |
|---|---|---|
| 4,325,637 | 4/1982 | Moore . |
| 4,340,306 | 7/1982 | Balasubramanian . |
| 4,355,899 | 10/1982 | Nussmeier . |
| 4,498,771 | 2/1985 | Makosch . |
| 4,902,133 | 2/1990 | Tojo et al. ............................ 356/356 |
| 5,206,704 | 4/1993 | Huber et al. ......................... 356/356 |
| 5,387,975 | 2/1995 | Ishida et al. ......................... 356/354 |

OTHER PUBLICATIONS

*Optical Shop Testing*, second edition, edited by Daniel Malacara (Wiley, New York, 1992), Chapters 1, 2, and 3.
C. R. Munnerlyn and M. Latta, "Rough surface interferometry using $CO_2$ laser source," (Appl. Opt. 7(9) 1858–1859 (1968)).
R. René Benoît, "Application des phénomenes d'interférence a des déterminations métrologiques," J. de Phys. 3(7), 57–68 (1898).
K. Haines and B. P. Hildebrand, "Contour generation by wavefront reconstruction," Physics Letters, 19(1), 10–11 (1965).
J. Schwider et al., "Semiconductor wafer and technical flat planeness testing interferometer" (Appl. Opt. 25(7) 1117–1121 (1986)).

W. Jaerisch, G. Makosch, "Optical contour mapping of surfaces" (Applied Optics 12(7), 1552–1557 (1973)).
P. Jacquot, X. Colonna de Lega, P. M. Boone, "Common-path holographic interferometer for flatness testing," (SPIE 2248 Optics for productivity in manufacturing, paper 18 (1994)).
*Optical Shop Testing*, second edition, ediated by Daniel Malacara (Wiley, New York, 1992), Chapter 16.
*Flatness Measuring Instruments and Accessories*, Speedfam–Spitfire Products Group, Des Plaines, IL, 6 page brochure).
B. J. Chang et al, "Space–invariant achromatic grating interferometers: theory," Reprinted with the permission of the Optical Society of America from *Applied Optics*, vol. 14(7), pp. 1592/1600 (Jul. 1975). (pp–467–475).

Primary Examiner—Samuel A. Turner
Assistant Examiner—Robert Kim
Attorney, Agent, or Firm—Bryan Cave

[57] ABSTRACT

Optical system for measuring surface topography, comprised of a light source (30), a diffractive optical assembly (70, 72, 73) comprised of two or more diffraction gratings, holograms or like diffractive optics (120, 130; 122, 132; 123, 133), electronic detection means and digital signal processing means (10, 110) for determining surface height from interference data. The diffractive optical assembly (70, 72, 73) divides the incident light into two beams (150, 160; 152, 162; 153, 163), which subsequently impinge upon the object (20) at the same place on The object surface (70) but at two different angles of incidence. After reflection from the object surface, the beams pass separately back through the diffractive optical assembly (70, 72, 73), after which they combine once again and form an interference pattern representative of the surface topography. The equivalent wavelength of the resultant interference pattern is much greater than the illumination wavelength.

41 Claims, 11 Drawing Sheets

METHOD AND APPARATUS FOR PROFILING SURFACES USING DIFFRACTIVE OPTICS WHICH IMPINGES THE BEAMS AT TWO DIFFERENT INCIDENT ANGLES

FIELD OF THE INVENTION

The invention relates generally to precision optical metrology instrumentation for imaging and analysis of surfaces, and more particularly, to interferometers for surface profiling.

BACKGROUND AND PRIOR ART

Among the widely-used instruments for measuring surface profiles are interferometers, which use the wave nature of light to map variations in surface height with high accuracy. Examples of common interferometers are given, for example, in Chapters 1, 2 and 3 of the book *Optical Shop Testing*, second edition, edited by Daniel Malacara (Wiley, New York, 1992). Most of these conventional interferometric means cannot accommodate surface features with discontinuous height variations or surface roughness that exceed one-quarter of the wavelength of the source light. Such surface features result in interferometric phase ambiguities that are difficult or impossible to interpret. A further difficulty arises when the surface slope is so large that it becomes difficult to resolve the interference fringes.

As a consequence of the limited range of application for conventional interferometers, the prior art provides some alternative methods and means that seek to reduce the sensitivity of the measurement. One obvious method involves increasing the wavelength of the light through the use of unusual sources. An example method and apparatus is disclosed in the paper "Rough surface interferometry using a $CO_2$ laser source," by C. R. Munnerlyn and M. Latta (Appl. Opt. 7(9) 1858–1859 (1968)). However, such methods are generally very expensive and cumbersome, since they involve specialized sources, optics and detectors.

Another prior-art approach to overcoming the limited range of conventional interferometers involves the use of multiple wavelengths, as originally described by R. René Benoît in the paper "Application des phénomènes d'interférence a des déterminations métrologiques," J. de Phys. 3(7), 57–68 (1898). A sequence of measurements at two or more wavelengths provides a much larger equivalent wavelength that overcomes some of the ambiguity problems of conventional single-wavelength interferometers. A method for applying this technique to surface metrology is disclosed in U.S. Pat. No. 4,355,899, issued to T. A. Nussmeier. However, these multiple wavelength techniques still do not function correctly when the surface slope is so large that it becomes difficult to resolve the interference fringes. In the prior art two-wavelength holographic method described by K. Haines and B. P. Hildebrand in an article entitled "Contour generation by wavefront reconstruction," *Physics Letters*, 19 (1), 10–11 (1965), the net result of two-wavelength reconstruction of the holographic image is the appearance of contour intervals of constructive interference. However, this method is difficult to use in practice.

A prior art method of profiling surfaces using scanning white light interferometry is disclosed in U.S. Pat. No. 4,340,306 issued to N. Balasubramanian. This patent describes a white-light interferometer that comprises a mechanically-scanned reference mirror, a two-dimensional detector array, and computer control. The disclosed prior art method involves scanning either the reference mirror or the object in discrete steps, measuring the fringe contrast for each point in the image for each scan position, and in this way determining for each surface point the position of maximum fringe contrast. The scan position for which the contrast is maximum is a measure of the relative height of a particular surface point. However, this prior art technique is very slow and does not work well with large, rough surfaces because of the difficulty in resolving the interference fringes.

The prior art also provides some alternative measurement geometries that seek to reduce the sensitivity of the measurement to surface roughness, surface slope and multiple reflections. A representative prior-art technique in this regard is described in U.S. Pat. No. 4,325,637 issued to R. C. Moore, in which a grazing incidence interferometer employs extreme angles of illumination in order to reduce the fringe density on the object surface. Another form of grazing incidence interferometer is described by J. Schwider, R. Burow, K. E. Elssner, J. Grzanna, and R. Spolaczyk in a paper entitled "Semiconductor wafer and technical flat planeness testing interferometer" (Appl. Opt. 25(7) 1117–1121 (1986)). However, the significant reduction in sensitivity in these prior art approaches requires a large illumination angle with respect to normal incidence. Such large angles create problems with proper illumination and imaging of the object. There may also be undesirable shadowing from surface features such as steps and channels.

Another form of prior art interferometer working at extreme angles of incidence is disclosed in U.S. Pat. No. 4,498,771 issued to G. Makosch. The disclosed apparatus uses a birefringent crystal, such as a Wollaston prism, and a system of mirrors to direct the light beam to the object. In FIG. 2a. of U.S. Pat. No. 4,498,771 there is depicted an embodiment that seeks to greatly increase the effective fringe spacing in the interference pattern by illuminating the object with two beams at two different angles, with this embodiment being described in columns 3 and 4 of the patent. However, the use of such a birefringent crystal limits the size of objects that may be observed to only a few centimeters at most. The apparatus also appears to be complicated and difficult to align.

Still another prior art approach to reducing the sensitivity of optical interferometers through alternative geometries is described by W. Jaerisch and G. Makosch in a paper entitled "Optical contour mapping of surfaces" (Applied Optics 12(7), 1552–1557 (1973)). This paper describes a prior art method that employs a diffractive optical element, in this case a diffraction grating, placed nearly in contact with the test surface. Illumination of the grating by a monochromatic plane wave generates an interference pattern between the beam components of two different diffraction orders. This pattern is reflected off of the object surface and is superimposed back onto the grating, resulting in a fringe pattern that resembles the surface contours of the object surface. These contours may be much larger than the wavelength of the source light. A similar prior art approach to creating desensitized fringes is described in a paper in a paper entitled "Common-path holographic interferometer for flatness testing" by P. Jacquot, X. Colonna de Lega and P. M. Boone (SPIE 2248, Optics for productivity in manufacturing, paper 18 (1994)). The instrument also works by the interaction of two diffraction orders of a diffractive optical element, however in this case the element is a holographic recording of a spherical wavefront.

Both the prior art method of Jaerisch and Makosch and the prior art method of Jacquot et al. require placing a diffractive element nearly in contact with the object surface. This is because in both methods a single diffractive element divides the source light into two beams which propagate in different directions and do not perfectly overlap on the object surface. The two beams are, therefore, not properly oriented for generating the desired interference effect, especially on rough surfaces. A further difficulty is that the two beams have an increasingly large optical path difference as the object is moved further away from the diffractive element; whereas the desired interference effect is most easily achieved when this optical path difference is small. The only way to avoid such problems in these prior-art optical profilers is to bring the object very close to the surface of the diffracting element. However, this very close working distance is undesirable and often impractical. Actual contact with the element can damage it severely, and a close working distance complicates parts handling and automation, particularly in industrial environments.

A further difficulty with the prior art in interferometric metrology arises when the object is partially transparent, since the resulting interference pattern is often a complex mixture of fringes created by reflections from both the front and back surfaces of the plate. In order to do meaningful metrology on such an object, the common practice is to either thinly coat the front surface with a high reflectivity material, or defeat the back-surface reflection by applying some kind of index-matching coating. These kinds of surface treatments are very undesirable for regular inspection and testing, particularly for process control in a production environment. In the copending, commonly-owned U.S. patent application entitled "Method and apparatus for profiling surfaces of transparent objects" (Ser. No. 08/153,146, filed Nov. 15, 1993 there is disclosed a method whereby the two surfaces may be mathematically isolated after two measurements, but this approach requires complicated apparatus and procedures.

As a consequence of the great difficulties in using interferometry for a variety of important applications, the prior art provides several optical profiling techniques that are not based on the wave nature of light. A representative example is moiré fringe analysis. This prior art technique is described in detail in Chapter 16 of the book *Optical Shop Testing*, second edition, edited by Daniel Malacara (Wiley, New York, 1992). The prior art moiré method involves the projection and imaging of a ronchi ruling or like periodic structure, and is equivalent to geometric triangulation. A commercial product based on this principle is the Chek-flat, manufactured by Speedfam-Spitfire products group (Des Plaines, Ill. 60016). Although this product is capable of profiling rough surfaces, it is generally of very low accuracy when compared to optical interferometry, and does not work at all for specular surfaces.

Thus, the prior art techniques do not satisfactorily provide an apparatus and method for accurately profiling both rough and smooth surfaces using desensitized interference fringes at a useful working distance, or a method and means of profiling partially-transparent plane-parallel objects. These disadvantages of the prior art are overcome by the present invention.

SUMMARY OF THE INVENTION

In accordance with the presently preferred method and apparatus of the present invention, a diffractive optical assembly is illuminated by a light source, which may for example be an incandescent bulb or a laser. The assembly is comprised of two or more diffractive optics such as diffraction gratings, holograms or the like. The diffractive optical assembly divides the source light into two beams, which propagate in two different directions through the assembly. When these beams exit the assembly, they are oriented in such a way that they overlap on the object surface at a suitable working distance. After reflection from the object surface, the beams pass back through the diffractive optical assembly in different directions, after which they are recombined to form an interference pattern representative of the surface profile. The interference pattern is then evaluated electronically or by visual inspection. A fundamental characteristic of the interference pattern generated by the present invention is that it has reduced sensitivity to surface deformation and surface roughness. This reduction in sensitivity is achieved with the object placed at a conveniently-large working distance. An additional advantage of the invention is that it may be used with diffuse, white-light sources, and can, therefore, distinguish between the surfaces of partially-transparent, plane-parallel objects.

BRIEF DESCRIPTION OF THE DRAWINGS

In the drawings, wherein like reference characters denote similar elements throughout the several views.

DETAILED DESCRIPTION OF THE INVENTION

Figure 1:
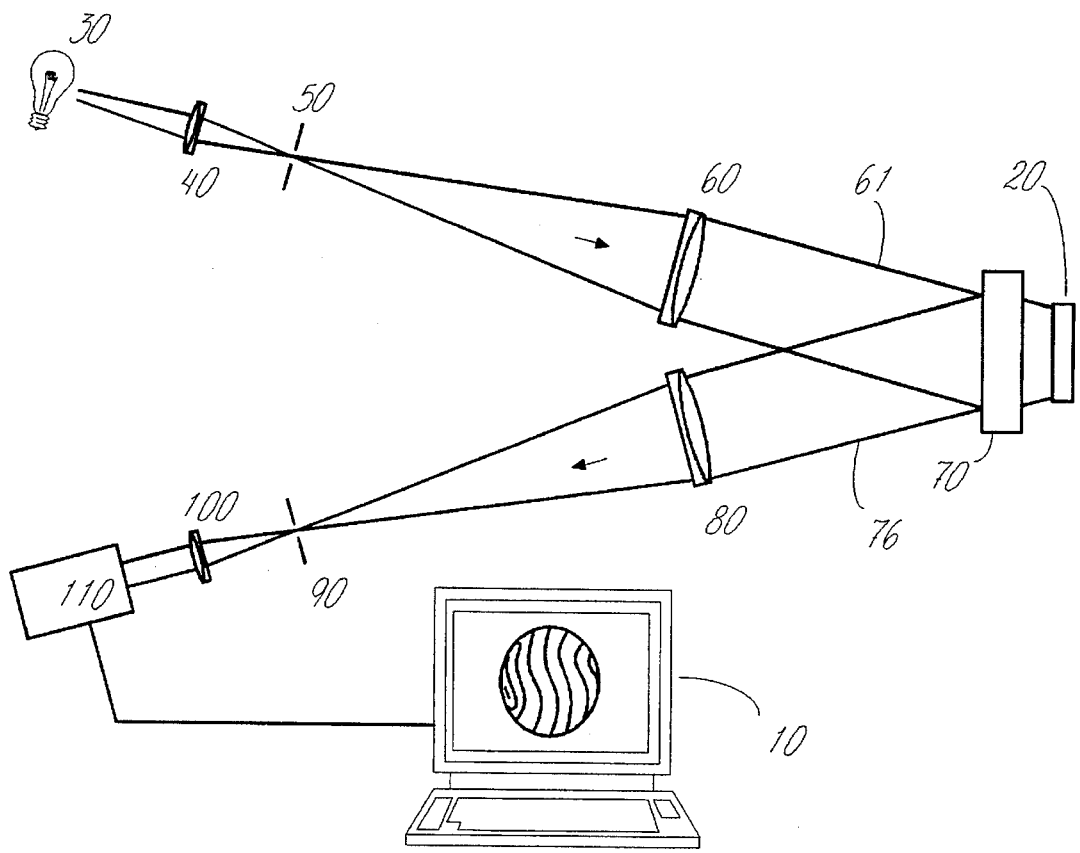
FIG. 1 is a drawing showing a preferred embodiment of the invention, showing the object, the light source, the diffractive elements, an electronic camera, and such additional optical elements as are required for illuminating the object and manipulating the interference pattern.

Referring now to the drawings in detail, and initially to FIG. 1, FIG. 1 shows a preferred embodiment of the inventive optical surface profiler, setup to measure the surface profile of an object 20. The illumination is provided by source 30, which may for example be an incandescent lamp, a light-emitting diode, a laser or the like. Lens 40 collects the light from the source 30 and directs it through an aperture 50, after which it is collimated by lens 60 to create a substantially parallel light beam 61. A diffractive optical assembly 70, illustrated in greater detail in FIG. 2, divides the source light into two beams and orients their direction of propagation so that they impinge upon the object surface at the same place but at two different incident angles. After reflection from the surface of object 20, the beams pass back through the diffractive optical assembly 70 and are recombined into an exit beam 76. After passing through a lens 80 and a diaphragm 90, the exit beam is collected by a lens 100. Lens 100 is preferably adjusted so that surface 20 is focused onto a detector 110, which may be a conventional CCD camera or like device for producing electronic images. Computer 10 then conventionally displays the image, and preferably calculates the height for every point in the image, resulting in a three-dimensional image of the object surface.

The interference effect is created by the relative phase shift between the two beams, this phase shift being proportional to the surface profile. The physical cause of the phase shift is made evident by reference to FIG. 2, in which the beam paths through the currently preferred embodiment of the diffractive optical assembly 70 are more clearly represented. An illuminating beam 140 impinges first on a grating 120, which divides beam 140 into a beam 150 and a beam 160 according to optical principles well known in the art (as taught, for example, in the book *Fundamentals of Optics* by F. A. Jenkins and H. E. White (McGraw-Hill, New York, 1976)). In a next step, beams 150 and 160 are diffracted by a second diffraction grating 130, and subsequently impinge upon a surface 170 of object 20. Upon reflection, the beams propagate back towards grating 130, which diffracts them in such a way that they recombine at the surface of grating 120. The recombined beams are then diffracted into a common exit beam 180.

It is well understood in the art that when a light beam is divided into two parts and recombined, therein results an interference effect which modulates the intensity g of the recombined beams. The formula for this modulation is $$g = g_0 + V g_0 \cos(\phi),$$

where V is the interference contrast and $\phi$ is the interferometric phase difference between the two beams, and $g_o$ is a constant. The phase difference $\phi$ is itself related to the mean wavelength $\lambda$ of the illumination and the difference OPD in optical path traversed by the two beams:

$$\phi = 2\pi \frac{OPD}{\lambda}.$$

Figure 2:
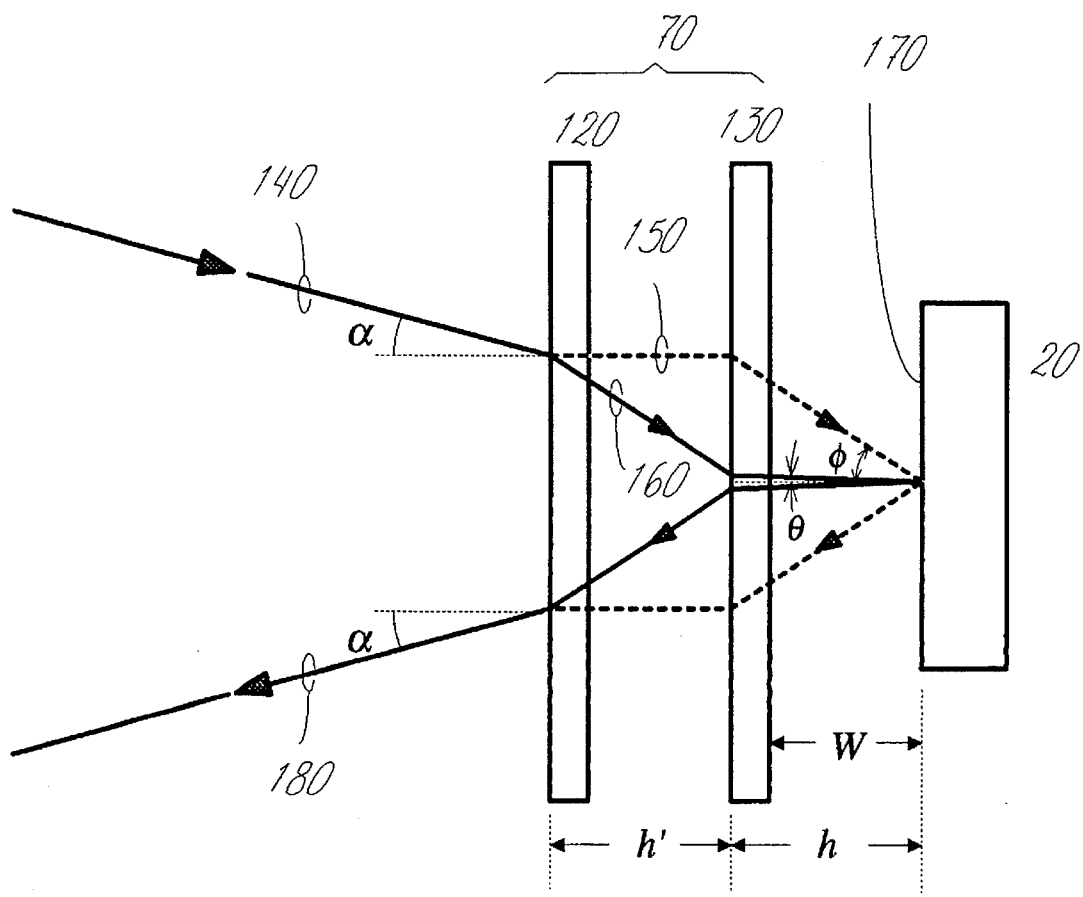
FIG. 2 is a drawing showing in detail the beam paths through the embodiment of FIG. 1 employing the diffractive optical assembly.

From FIG. 2 it can be seen that $$OPD = 2(h - h') \left( \frac{1}{\cos(\theta)} - \frac{1}{\cos(\phi)} \right),$$

where $\theta$ is the angle of incidence of beam 160 with respect to surface 170 of object 20, $\phi$ is the angle of incidence of beam 150 with respect to surface 170 of object 20, h is the distance from surface 170 to diffraction grating 130, h' is the distance between gratings 120 and 130, and W is the working distance. In Eq.(3.), the refracting effect of the transparent grating substrates are neglected for simplicity. From this equation it is evident that the optical path difference OPD is near zero when the two distances h and h' are approximately the same. At this same position, the two beams overlap perfectly on the surface. These are the requisite conditions for maximizing the contrast V and thus for obtaining the highest-quality interference pattern. By suitable selection of the distance h' almost any working distance W can be obtained, limited only by the physical dimensions of the gratings and associated mounting hardware.

The sensitivity of the inventive optical surface profiler to surface deformations may be represented by an effective wavelength $\Lambda$ defined by $$\Lambda = \frac{2\pi}{d\phi/dh},$$

where $d\phi$ is a small change in the interference phase corresponding to a small variation dh in the distance h. This calculation is readily performed for the preferred embodiment shown in FIG. 2.

$$\Lambda = \frac{\lambda}{\cos(\theta) - \cos(\phi)}.$$

It is seen that, in principle, any effective wavelength $\Lambda \geq \lambda$ may be created by suitable choice of angles $\theta$, $\phi$.

These considerations will be made more clear by the following example. The terminology and optical principles used here are based on chapter 17 of the book *Fundamentals of Optics* by F. A. Jenkins and H. E. White (McGraw-Hill, New York, 1976). Suppose for example we select two gratings for the preferred embodiment shown in FIG. 2, the first grating 120 having 300 grooves per mm (gpm) and the second grating 130 having 600 gpm. For this example, the entrance beam 140 impinges upon grating 120 at an angle $\alpha$ of 10.95 degrees. The +1 diffracted order is therefore beam 150 while the −1 diffracted order is beam 160 in FIG. 2. Grating 130 then diffracts beam 150 into the −1 order at an angle $\phi$ equal to 22.3 degrees. Beam 160 is diffracted by grating 140 into the +1 order, which in this case is substantially at normal incidence to the object surface, thus $\theta = 0$. After reflection from the surface 170, beam 150 is diffracted by grating 130 into the −1 order, then by grating 120 into the +1 order, so that it exits grating 122 at an angle equal to $\alpha$. Meanwhile, beam 160 reflects from surface 170 and is diffracted by grating 130 into the +1 order. Beam 160 is subsequently diffracted by grating 120 into the −1 order, and is in this way combined with beam 150 into an exit beam 180. The effective wavelength $\Lambda$ for a source wavelength of 0.633 microns is in this example 8.46 microns. The working distance $W$ is equal to the distance h less the thickness of grating 130. For example, if the gratings are placed 4 cm apart and are each 1 cm thick, the working distance is 3 cm.

It is significant that the preferred geometry shown in FIG. 2 is entirely compatible with diffuse, white-light illumination, such as is generated by ordinary incandescent sources and the like. Here the term "white light" refers to any illumination that is characterized by a large spectral distribution when compared to lasers, low-pressure arc lamps and like sources of substantially monochromatic radiation, and may be satisfied, for example, by a light emitting diode having a large spectral distribution when compared to lasers. In FIG. 2, it is clear that beams 150 and 160 both pass through an equal quantity of glass, traverse substantially equal optical path lengths, and overlap without lateral shear on the surface. These are the essential conditions for white light interferometry. Although lasers may be used with the apparatus and method of the present invention in place of a white light source, the use of a white-light source substantially simplifies and reduces the cost of the inventive apparatus, since white-light sources are widely available, less costly than laser sources, and do not produce undesirable spurious interference effects.

Figure 3:
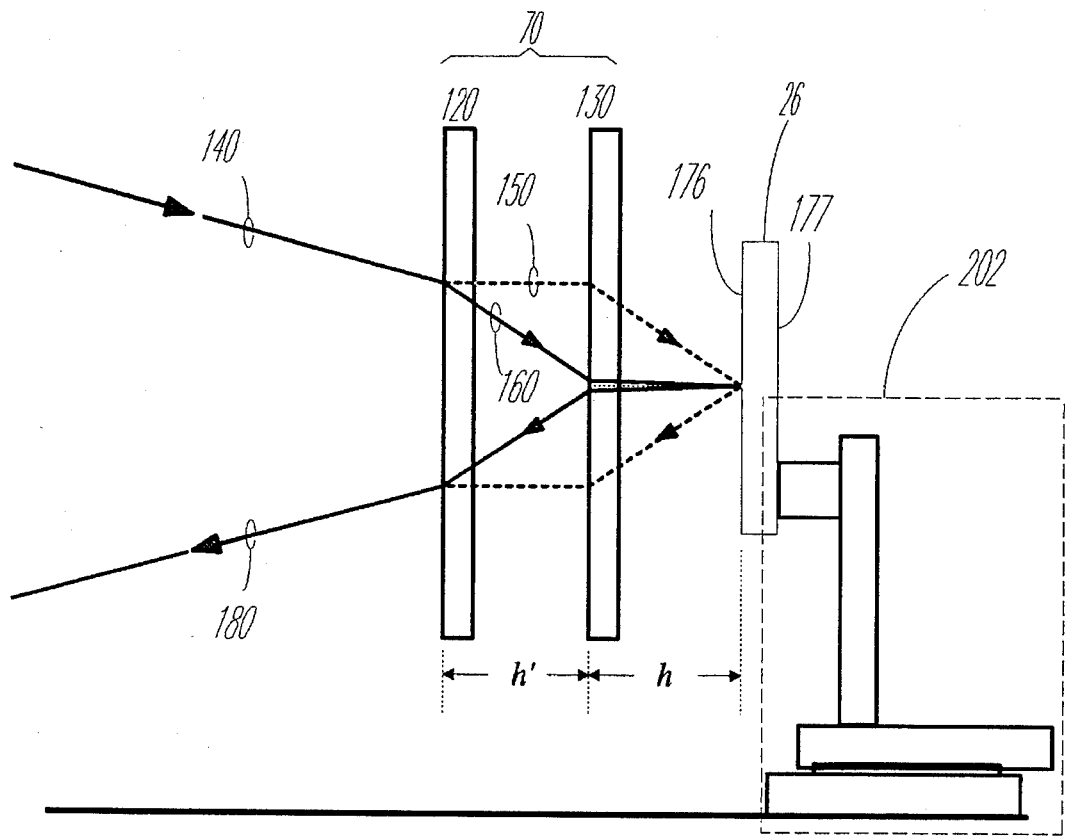
FIG. 3 is a drawing depicting a portion of the preferred apparatus of FIG. 1 arranged for profile measurement of the front surface of a transparent plane-parallel object.
Figure 4:
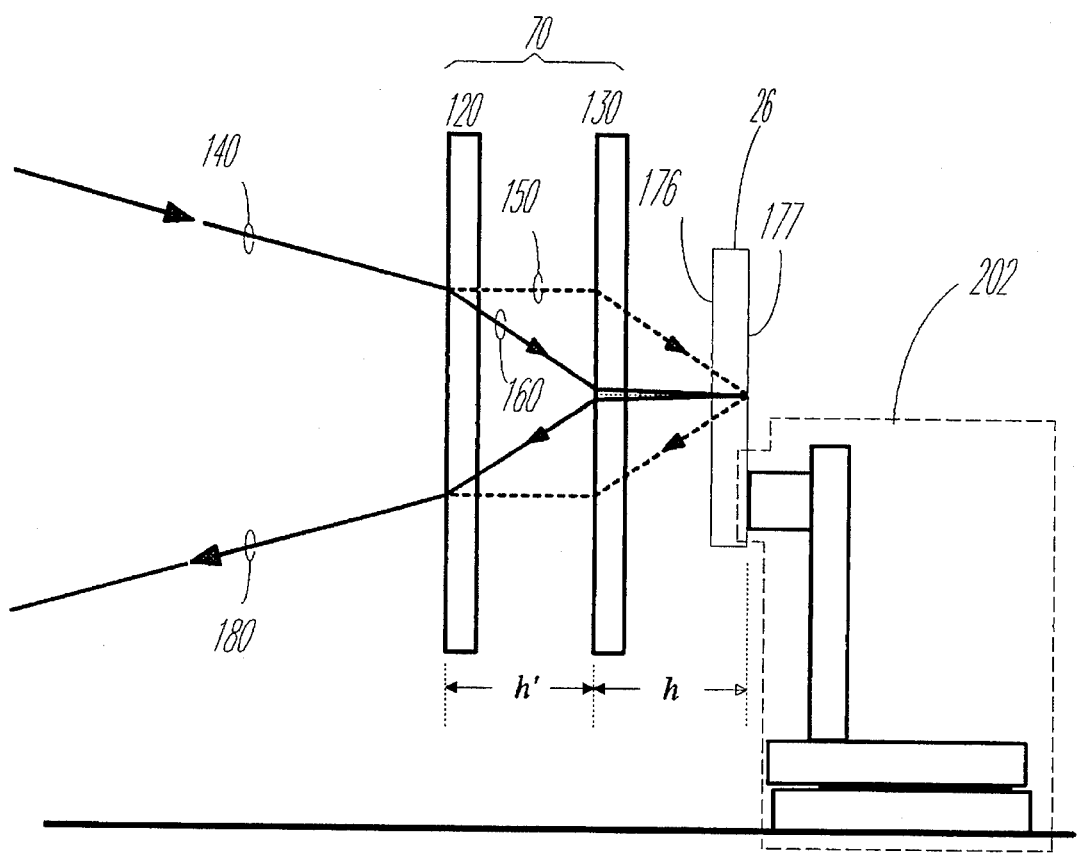
FIG. 4 is a drawing depicting a portion of the preferred apparatus of FIG. 1 arranged for profile measurement of the back surface of a transparent plane-parallel object.

An additional advantage of the invention is that it is capable of measuring independently the front and back surfaces of a partially-transparent plane-parallel object, without suffering from the multiple-reflection problems characteristic of prior-art Fizeau interferometers. For this purpose, the inventive apparatus preferably includes a diffuse white light source, so that spurious reflections do not contribute to the interference effect. In FIG. 3 there is shown a partially-transparent plane-parallel object 26 held in position by a stage 202 capable of translating object 26 in such a way as to modify distance h. In that interference can only occur in diffuse white light for distances h substantially equal to the grating separation h', only the front surface 176 of object 26 contributes to the interference pattern. The light reflected from the back surface 177 of object 26 in FIG. 3 does not contribute to the fringe pattern. However, when object 26 is translated by stage 202 so that the back surface 177 of object 26 is at a distance h, as shown in FIG. 4, front surface 176 no longer contributes to the interference effect. Thus the apparatus and method of the present invention is capable of independently measuring the front and back surface profiles of a partially-transparent object.

A further advantage of the present invention is that the interference image generated by the instant invention is substantially of the same nature, apart from the advantageous reduced sensitivity, as images generated by conventional prior-art interferometers while overcoming the disadvantages of prior art methods for measuring surface profiles. Thus several of the known methods of interference fringe analysis are still compatible with the invention and may be employed, if desired. Many of these methods are taught in the book *Optical Shop Testing*. For example, the interference image projected on the monitor of computer 10 may be interpreted visually, or processed by analysis of the interference fringe pattern. The interference image is compatible with several commercially-available computer software packages, such as the ZAPP fringe analysis software distributed by Zygo Corporation (Middlefield, Conn.).

Figure 5:
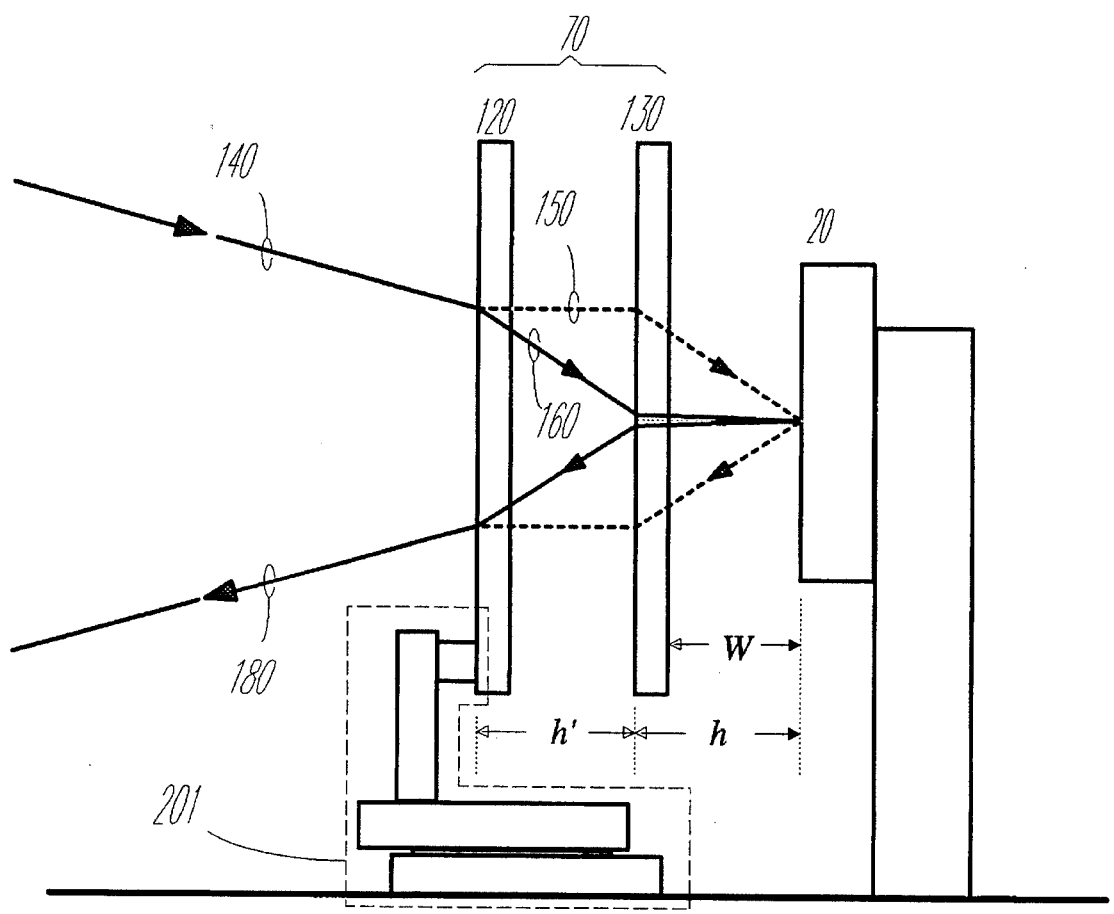
FIG. 5 is a drawing depicting an alternative embodiment of the apparatus of FIG. 1 which includes additional means for performing phase-shifting interferometry.

For high-precision measurements, it is preferable to provide mechanical means of precisely displacing the diffractive optical assembly 70, or one of its components, or the object itself, so as to generate controlled phase shifts in the interference pattern, in accordance with methods referred to in the art as phase shift interferometry (see for example, Chapter 12 of the book *Optical Shop Testing*). FIG. 5 shows how such mechanical means can introduce phase shifts. Grating 120 is shown supported by a mechanical stage 201, capable of modifying grating separation h'. According to Eq.(3). above, the effect of altering grating separation h' is to modify the optical path difference OPD and hence the interferometric phase $\phi$, as may be seen by reference to Eq.(2.). In accordance with a preferred method of the present invention, interference patterns are recorded for a sequence of equally-spaced phase shifts produced by altering the grating separation h' by means of mechanical stage 201. These interference patterns are processed to generate an accurate phase image representative of the wavefront reflected from the transparent object. The apparatus for detecting, storing and processing the patterns is preferably substantially the same as is shown in FIG. 1, and is comprised of camera 110 and computer 10.

Figure 6A:
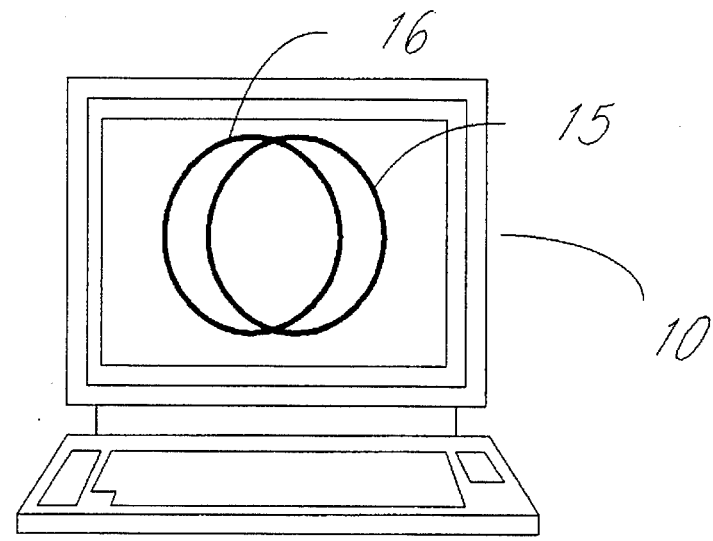
FIG. 6 is a drawing showing a method of object alignment based on the superposition of two camera images.
Figure 6B:
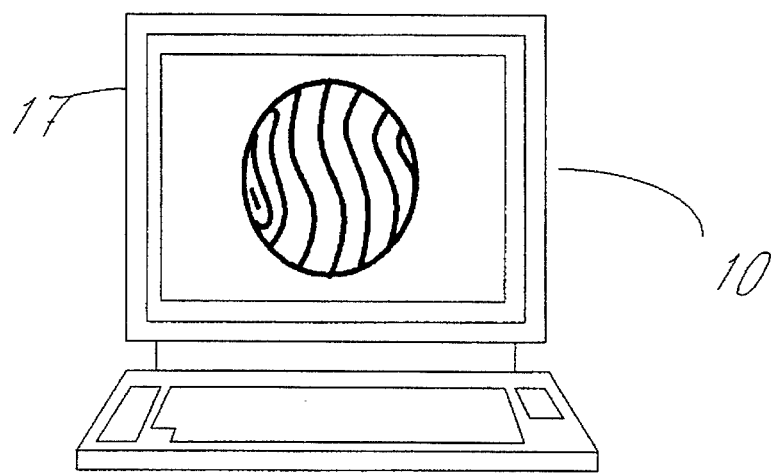

A further advantage of the optical surface profiler of the present invention is that it is very easy to align. The interference fringe pattern is easy to obtain, thanks to the large equivalent wavelength $\Lambda$. Further, it is possible to distinguish two images 15, 16 on the monitor of computer 10 (FIG. 1) when the object is not properly aligned. Thus one way to obtain approximate alignment is to adjust the object until these two images 15, 16 are superimposed. The procedure is made more clear by reference to FIG. 6(a), which shows the images 15, 16 before alignment, and FIG. 6(b), which shows the image 17 after alignment. Several of the known techniques for interferometer alignment are also compatible with the invention. Many of these are taught in the book aforementioned *Optical Shop Testing*.

Figure 7:
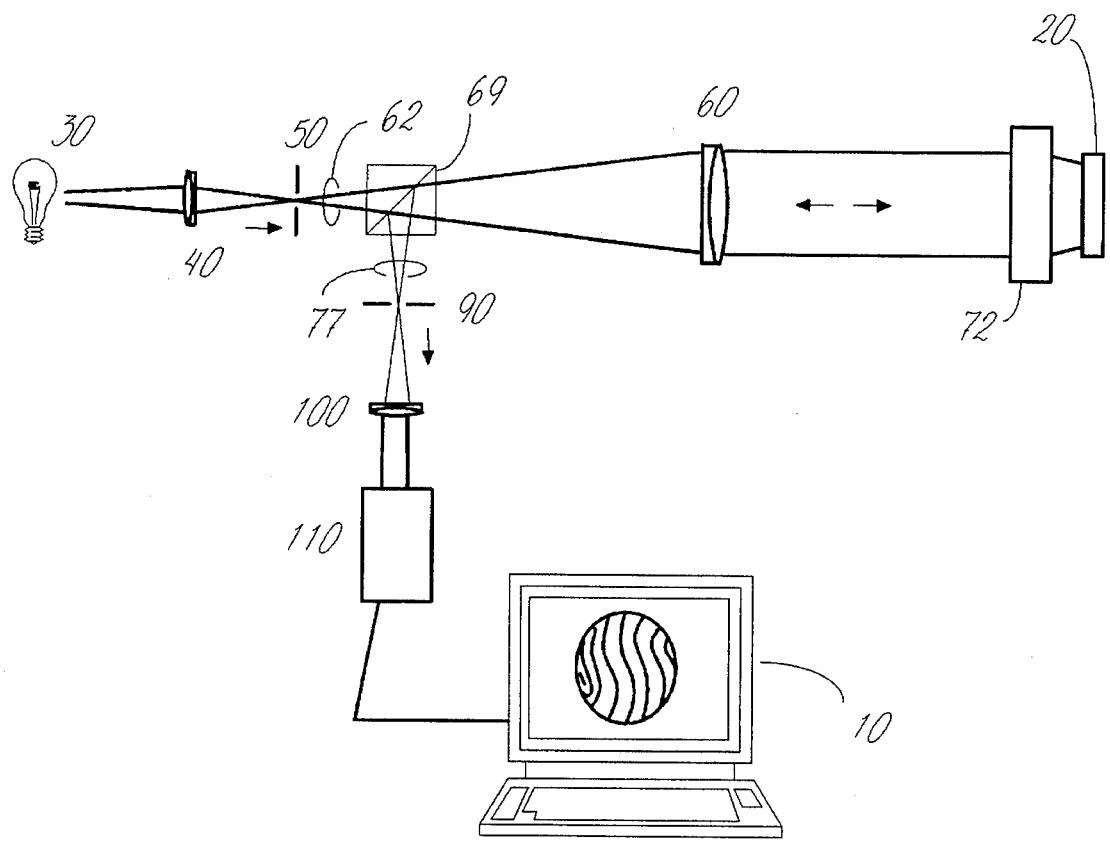
FIG. 7 is a drawing depicting an alternative embodiment of the invention illustrated in FIG. 1, in which the illuminating and reflected beams share a common collimating lens.
Figure 8:
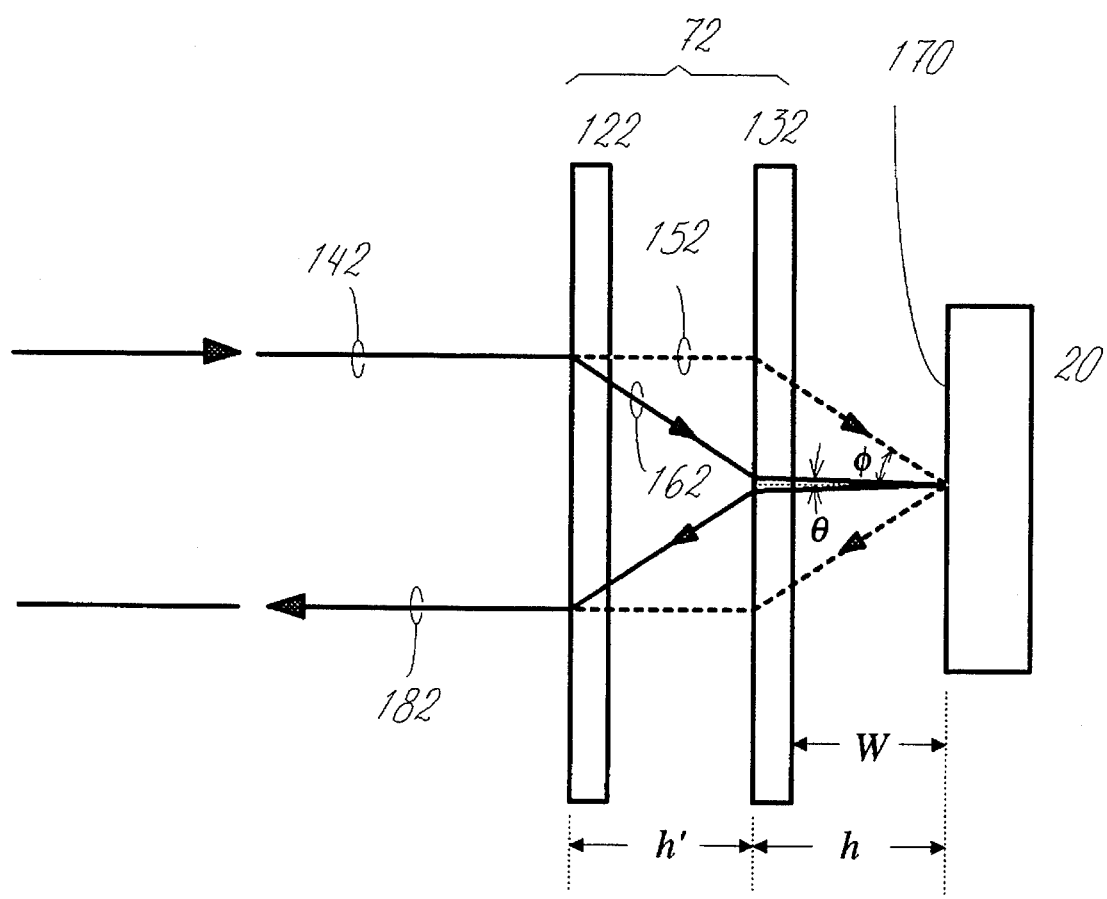
FIG. 8 is a drawing showing in detail the beam paths through the alternative embodiment of FIG. 7 employing the diffractive optical assembly.

In addition to the presently preferred form of the diffractive optical assembly shown in FIG. 2, several alternative embodiments are also possible. For example, a different combination of diffraction gratings may be chosen to provide different paths for beams 150 and 160 through diffractive optical assembly 70, while at the same time orientating beams 150 and 160 so that they impinge upon object surface 170 at the same place on surface 170 but at two different angles of incidence. Some of these alternative embodiments will now be considered with reference to FIGS. 7–11.

in FIG. 7 there is shown an alternative embodiment, in which an illuminating beam 62 and a reflected beam 77 share a common collimator 160. The reflected beam is directed to camera 110 by a beam splitter 69. FIG. 8 depicts a suitable diffractive optical assembly 72 for this configuration. Diffractive optical assembly 72 is comprised of two gratings 122 and 132 having substantially the same number of grooves per millimeter. Suppose for example we select two gratings 122 and 133 having 600 gpm. For this example, an entrance beam 142 impinges upon grating 122 at substantially normal incidence. The zero'th diffracted order is, therefore, beam 152 while the −1 diffracted order is beam 162. Grating 132 then diffracts beam 152 into the −1 order at an angle $\phi$ equal to 22.3 degrees. Beam 162 is diffracted by grating 132 into the +1 order, which, in this case, is substantially at normal incidence to the object surface, thus $\theta=0$. After reflection from the surface 170, beam 152 is diffracted by grating 132 into the −1 order, then by grating 122 into the +1 order, so that it exits grating 122 nearly perpendicular to its surface. Meanwhile, beam 162 reflects from surface 170 and is diffracted by grating 132 into the +1 order. Beam 162 subsequently passes through grating 122 and is combined with beam 152 into an exit beam 182.

Figure 9:
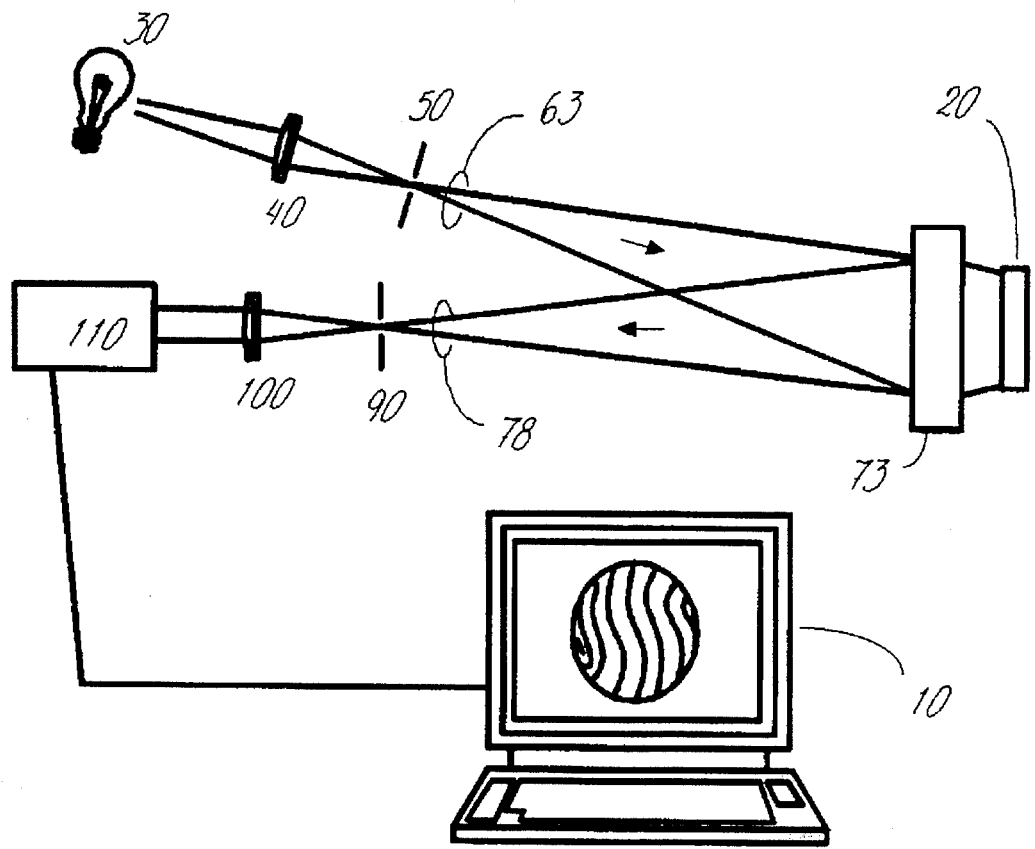
FIG. 9 is a drawing depicting another alternative embodiment of the invention of FIG. 1 in which the diffractive optical assembly is comprised of holographic elements that replace the collimating lenses.
Figure 10:
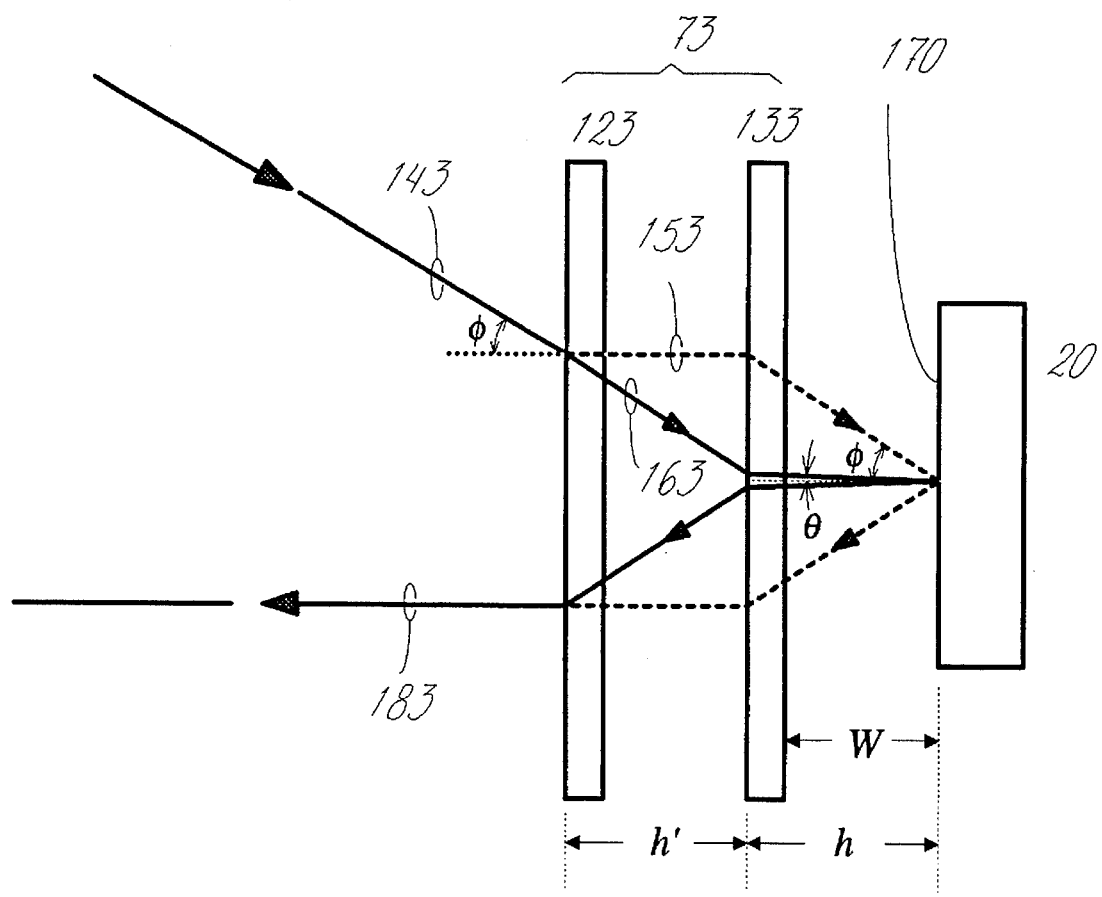
FIG. 10 is a drawing showing in detail the beam paths through the alternative embodiment of FIG. 9 which employs the diffractive optical assembly using holographic optical elements.

A further possibility is to use holograms instead of diffraction gratings, to obtain substantially the same result but with possible additional benefits of simplifying the optical design and reducing the effects of spurious diffractions. FIG. 9 depicts a suitable optical geometry for an embodiment employing a diffractive optical assembly 73 comprised of holographic elements. The holographic elements in this example differ from ordinary diffraction gratings in that they not only divide the light up into various diffraction orders in the form of beams 153 and 163 which are ultimately reflected back from surface 170, but also collimate and focus the light in a manner analogous to lenses. Thus collimating lenses 60 and 80 shown in FIG. 1 are not necessary for the holographic embodiment shown in FIG. 9. FIG. 10 depicts a possible arrangement of two holographic elements 123 and 133 within diffractive optical assembly 73. In the previous two embodiments shown in FIGS. 2 and 8, the net number of diffractions is equal to zero, whereas for the holographic embodiment shown in FIG. 10, the exit beam 183 corresponds to an uncompensated +1 diffraction of hologram 123. This diffractive order focuses the light, so that additional collimating optics are not necessary. Hologram 123 can be generated photographically by exposing it to two divergent wavefronts, in accordance with holographic principles known in the art (see for example, the book *Optical Holography*, by R. J. Collier, C. B. Burckhardt and L. H. Lin (Academic Priss, Inc. New York, 1971)). An additional advantage of this embodiment is that spurious diffraction orders are not properly focused and are, therefore, more easily rejected from the desired image.

Figure 11:
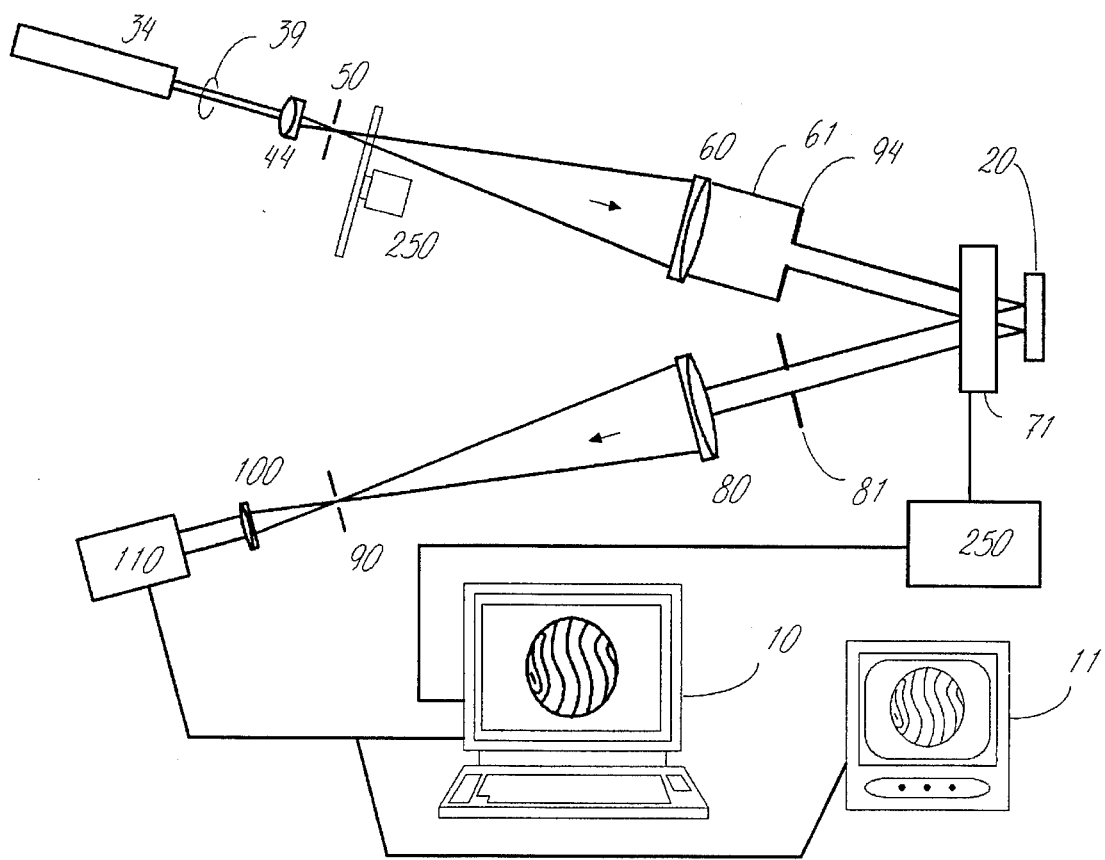
FIG. 11 is a drawing depicting still another alternative embodiment of the invention of FIG. 1.

FIG. 11 depicts still another alternative embodiment of the present invention, substantially the same as the presently preferred embodiment of FIG. 1, but with the addition of various optical elements that may prove advantageous in commercializing the instrument. Referring to FIG. 11, there is shown a laser source 34 emitting a beam 39, which is focused by lens 44 so as to create a divergent beam 39. Beam 39 passes through a variable neutral-density filter (not shown) which is used to optimize the light intensity level according to the reflectivity of object 20. Also shown in FIG. 11 are two diaphragms 94 and 81, which control the size of the illuminating beam and block spurious beams from reaching camera 110. FIG. 11 also shows an image monitor 11, which permits continuous viewing of the camera signal. Also shown in FIG. 11 is are means 250 for introducing controlled phase shifts in the interference pattern, in accordance with the arrangement shown in FIG. 5. Those skilled in the art will appreciate that additional substitutions, omissions and changes in form or detail of the disclosed methods and apparatus may be made without departing from the spirit and scope of the present invention.

By utilizing the method and apparatus of the present invention, an optical profile is provided which has the ability to measure rough surfaces, to measure surfaces having large deformations and large slopes, to measure surfaces using almost any source of light, including diffuse white light, to measure partially-transparent objects having plane-parallel surfaces, has a compatibility with known methods of interference fringe analysis, is easy to align, and has excellent fringe contrast since both interfering beams are reflect from the object surface, while providing a practical working distance for the measurement, and without resorting to expensive or cumbersome components or devices.

What is claimed is:

1. A method for profiling an object surface using desensitized interference fringes comprising the steps of illuminating a diffractive optical assembly with a source of light, dividing the source light illuminating said diffractive optical assembly into two beams which propagate in two different directions through said diffractive optical assembly, said beams exiting said diffractive optical assembly substantially overlapping at said object surface at a distance from said diffractive optical assembly with said beams impinging upon said object surface at substantially the same place at two different incident angles, reflecting said impinging beams from said object surface back toward said diffractive optical assembly, said reflected beams passing back through said diffractive optical assembly in different directions, and recombining said reflected beams passing back through said diffractive optical assembly to form an interference pattern representative of the surface profile of said object surface, said interference pattern having reduced sensitivity to surface deformation and surface roughness.

2. A method in accordance with claim 1 wherein said illuminating step comprises the step of illuminating said diffractive optical assembly with a white light source.

3. A method in accordance with claim 2 wherein said white light source is a diffuse white light source.

4. A method in accordance with claim 3 wherein said object surface comprises a surface of a partially transparent plane-parallel object.

5. A method in accordance with claim 1 wherein said light source comprises an incandescent bulb.

6. A method in accordance with claim 1 wherein said light source comprises a laser.

7. A method in accordance with claim 1 wherein said light source comprises a light emitting diode.

8. A method in accordance with claim 1 further comprising the step of determining surface height from data associated with said interference pattern.

9. A method in accordance with claim 1 wherein said source light has an associated illumination wavelength and said interference pattern has an associated effective wavelength greater than said illumination wavelength, said effective wavelength being dependent on said incident angles on said object surface.

10. A method in accordance with claim 9 wherein said effective wavelength is represented by the expression $$\Lambda = \frac{2\pi}{d\phi/dh},$$

where $\Lambda$ is the effective wavelength, $d\omega$ is a small change in the interference phase corresponding to a small variation dh in the distance h from the object to said diffractive optical assembly, and $\phi$ is the interferometric phase difference between said two beams impinging on said object surface and being represented by the expression $$\phi = 2\pi \frac{OPD}{\lambda},$$

where $\lambda$ is the mean illumination wavelength and OPD is the difference in optical path traversed by the two beams.

11. A method in accordance with claim 10 wherein said diffractive optical assembly comprises a pair of diffraction gratings, the difference in optical path traversed by the two beams being represented by the expression $$OPD = 2(h - h') \left( \frac{1}{\cos(\theta)} - \frac{1}{\cos(\phi)} \right),$$

where $\Theta$ is the angle of incidence of an exit beam with respect to the object surface, $\phi$ is the angle of incidence of one of said beams passing through said diffractive optical assembly with respect to said object surface, h is the distance from the object surface to the diffraction grating closest to said object surface, and h' is the distance between the diffraction gratings comprising said diffractive optical assembly, said distance from said diffractive optical assembly comprising the distance h less the thickness of the diffraction grating closest to said object surface.

12. A method in accordance with claim 9 wherein said effective wavelength is represented by the expression $$\Lambda = \frac{\lambda}{\cos(\theta) - \cos(\phi)},$$

where $\phi$ is the angle of incidence of an exit beam with respect to the object surface and $\phi$ is the angle of incidence of one of said beams passing through said diffractive optical assembly with respect to said object surface; whereby any effective wavelength $\Lambda \geq \lambda$ may be created by suitable choice of said angles $\theta, \phi$.

13. A method in accordance with claim 4 wherein said object surface comprises a front surface of said partially transparent plane-parallel object, said object having front and back surfaces, said method further comprising the step of independently measuring the front and back surfaces of said partially transparent plane-parallel object.

14. A method in accordance with claim 13 wherein said diffractive optical assembly comprises a pair of diffraction gratings, the difference in optical path traversed by the two beams being represented by the expression $$OPD = 2(h-h')\left(\frac{1}{\cos(\theta)} - \frac{1}{\cos(\phi)}\right),$$

where $\Theta$ is the angle of incidence of an exit beam with respect to the object surface, $\phi$ is the angle of incidence of one of said beams passing through said diffractive optical assembly with respect to said object surface, h is the distance from the object surface to the diffraction grating closest to said object surface, and h' is the distance between the diffraction gratings comprising said diffractive optical assembly, said distance from said diffractive optical assembly comprising the distance h less the thickness of the diffraction grating closest to said object surface.

15. A method in accordance with claim 14 further comprising the step of placing the object surface to be profiled at said distance h with respect to said diffractive optical assembly.

16. A method in accordance with claim 14 wherein said source light has an associated illumination wavelength and said interference pattern has an associated effective wavelength greater than said illumination wavelength, said effective wavelength being dependent on said incident angles on said object surface.

17. A method in accordance with claim 16 said effective wavelength is represented by the expression $$\Lambda = \frac{\lambda}{\cos(\theta) - \cos(\phi)},$$

where $\phi$ is the angle of incidence of an exit beam with respect to the object surface and $\theta$ is the angle of incidence of one of said beams passing through said diffractive optical assembly with respect to said object surface; whereby any effective wavelength $\Lambda \geq \lambda$ may be created by suitable choice of said angles $\theta, \phi$.

18. A method in accordance with claim 1 further comprising the step of generating controlled phase shifts in said interference pattern.

19. A method in accordance with claim 18 wherein the step of generating controlled phase shifts comprises the step of displacing at least a portion of said diffractive optical assembly with respect to said object surface.

20. A method in accordance with claim 1 wherein said diffractive optical assembly comprises holographic elements.

21. An optical surface profiler for profiling an object surface using desensitized interference fringes, said profiler comprising an illumination source; a diffractive optical assembly optically aligned between said illumination source and said object surface, said illumination source illuminating said diffractive optical assembly, said diffractive optical assembly comprising means for dividing the source light illuminating said diffractive optical assembly into two beams which propagate in two different directions through said diffractive optical assembly, said beams exiting said diffractive optical assembly and substantially overlapping at said object surface at a distance from said diffractive optical assembly and impinging upon said object surface at substantially the same place at two different incident angles, said object surface reflecting said impinging beams from said object surface back toward said diffractive optical assembly, said reflected beams passing back through said diffractive optical assembly in different directions; and means for recombining said reflected beams to form an interference pattern representative of the surface profile of said object surface.

22. An optical profiler in accordance with claim 21 wherein said illumination source comprises a white light source.

23. An optical profiler in accordance with claim 22 wherein said white light source comprises a diffuse white light source.

24. An optical profiler in accordance with claim 23 wherein said object surface comprises a surface of a partially transparent plane-parallel object.

25. An optical profiler in accordance with claim 24 wherein said object surface comprises a front surface of said partially transparent plane-parallel object, said object having front and back surfaces, said profiler further comprising means for translating said object selectively to dispose either said back surface or said front surface at a common plane at which said beams impinge upon said selectively disposed object surface at the same place at two different incident angles while said other object surface is displaced from said common plane; whereby said front and back surfaces of said partially transparent plane-parallel object can be independently measured.

26. An optical profiler in accordance with claim 25 wherein said diffractive optical assembly comprises a pair of diffractive gratings, the difference in optical path traversed by the two beams being represented by the expression $$OPD = 2(h-h')\left(\frac{1}{\cos(\theta)} - \frac{1}{\cos(\phi)}\right),$$

where $\Theta$ is the angle of incidence of an exit beam with respect to the object surface, $\phi$ is the angle of incidence of one of said beams passing through said diffractive optical assembly with respect to said object surface, h is the distance from the object surface to the diffraction grating closest to said object surface, and h' is the distance between the diffraction gratings comprising said diffractive optical assembly, said distance from said diffractive optical assembly comprising the distance h less the thickness of the diffraction grating closest to said object surface.

27. An optical profiler in accordance with claim 26 wherein said translating means comprises means for placing said object surface to be profiled at said distance h with respect to said diffractive optical assembly, said distance h being located in said common plane.

28. An optical profiler in accordance with claim 26 wherein said source light has an associated illumination wavelength and said interference pattern has an associated effective wavelength greater than said illumination wavelength, said effective wavelength being dependent on said incident angles on said object surface.

29. An optical profiler in accordance with claim 28 wherein said effective wavelength is represented by the expression $$\Lambda = \frac{\lambda}{\cos(\theta) - \cos(\phi)},$$

where $\phi$ is the angle of incidence of the exit beam with respect to the object surface and $\theta$ is the angle of incidence of one of said beams passing through said diffractive optical assembly with respect to said object surface; whereby any effective wavelength $\Lambda \geq \lambda$ may be created by suitable choice of said angles $\theta, \phi$.

30. An optical profiler in accordance with claim 21 wherein said illumination source comprises an incandescent bulb.

31. An optical profiler in accordance with claim 21 wherein said illumination source comprises a laser.

32. An optical profiler in accordance with claim 21 wherein said illumination source comprises a light emitting diode.

33. An optical profiler in accordance with claims 21 wherein said source light has an associated illumination wavelength and said interference pattern has an associated effective wavelength greater than said illumination wavelength, said effective wavelength being dependent on said incident angles on said object surface.

34. An optical profiler in accordance with claim 33 wherein said effective wavelength is represented by the expression $$\Lambda = \frac{2\pi}{d\phi/dh},$$

where $\phi$ is the effective wavelength, $d\Lambda$ is a small change in the interference phase corresponding to a small variation $dh$ in the distance $h$ from the object to said diffractive optical assembly, and $\phi$ is the interferometric phase difference between said two beams impinging on said object surface and being represented by the expression $$\phi = 2\pi \frac{OPD}{\lambda},$$

where $\lambda$ is the mean illumination wavelength and OPD is the difference in optical path traversed by the two beams.

35. An optical profiler in accordance with claim 34 wherein said diffractive optical assembly comprises a pair of diffraction gratings, the difference in optical path traversed by the two beams being represented by the expression $$OPD = 2(h - h') \left( \frac{1}{\cos(\theta)} - \frac{1}{\cos(\phi)} \right),$$

wherein $\Theta$ is the angle of incidence of an exit beam with respect to the object surface, $\phi$ is the angle of incidence of one of said beams passing through said diffractive optical assembly with respect to said object surface, $h$ is the distance from the object surface to the diffraction grating closest to said object surface, and $h'$ is the distance between the diffraction gratings comprising said diffractive optical assembly, said distance from said diffractive optical assembly comprising the distance $h$ less the thickness of the diffraction grating closest to said object surface.

36. An optical profiler in accordance with claim 33 wherein said effective wavelength is represented by the expression $$\Lambda = \frac{\lambda}{\cos(\theta) - \cos(\phi)},$$

where $\phi$ is the angle of incidence of an exit beam with respect to the object surface and $\theta$ is the angle of incidence of one of said beams passing through said diffractive optical assembly with respect to said object surface; whereby any effective wavelength $\Lambda \geq \lambda$ may be created by suitable choice of said angles $\theta, \phi$.

37. An optical profiler in accordance with claim 21 further comprising means for generating controlled phase shifts in said interference pattern.

38. An optical profiler in accordance with claim 37 wherein said phase shift generating means comprises means for displacing said diffractive optical assembly with respect to said object surface.

39. An optical profiler in accordance with claim 38 wherein said diffractive optical assembly comprises at least two spaced apart diffraction gratings, said displacing means comprising means for displacing at least one of said diffraction gratings with respect to the others.

40. An optical profiler in accordance with claim 21 wherein said diffractive optical assembly comprises holographic elements.

41. An optical profiler in accordance with claim 21 wherein said diffractive optical assembly comprises a plurality of diffraction gratings.

\* \* \* \* \*

UNITED STATES PATENT AND TRADEMARK OFFICE
CERTIFICATE OF CORRECTION

PATENT NO. : 5,526,116                                    Page 1 of 2
DATED      : June 24, 1996
INVENTOR(S): Peter de Groot It is certified that error appears in the above-indentified patent and that said Letters Patent is hereby corrected as shown below:

| Column | Line | Delete | Insert |
|--------|------|--------|--------|
| 10 | 25 | "dw" | --$d\phi$-- |
| 10 | 60 | "$\phi$" | --$\theta$-- |
| 11 | 38 | "$\phi$" | --$\theta$-- |
| 11 | 39 | "$\theta$" | --$\phi$-- |

UNITED STATES PATENT AND TRADEMARK OFFICE
CERTIFICATE OF CORRECTION

PATENT NO. : 5,526,116
DATED : June 24, 1996
INVENTOR(S) : Peter de Groot

It is certified that error appears in the above-indentified patent and that said Letters Patent is hereby corrected as shown below:

| Column | Line | Delete | Insert |
|--------|------|--------|--------|
| 12 | 64 | "$\phi$" | --$\theta$-- |
| 12 | 65 | "$\theta$" | --$\phi$-- |
| 13 | 23 | "$\phi$" | --$\Lambda$-- |
| 13 | 23 | "d$\Lambda$" | --d$\phi$-- |
| 14 | 17 | "$\phi$" | --$\theta$-- |
| 14 | 18 | "$\theta$" | --$\phi$-- |

Signed and Sealed this

Fifteenth Day of October, 1996

Attest:

BRUCE LEHMAN

*Attesting Officer*     *Commissioner of Patents and Trademarks*